Aug. 24, 1954     E. B. CAPRA     2,687,317
BRACE FOR SCAFFOLDS
Filed Aug. 6, 1949
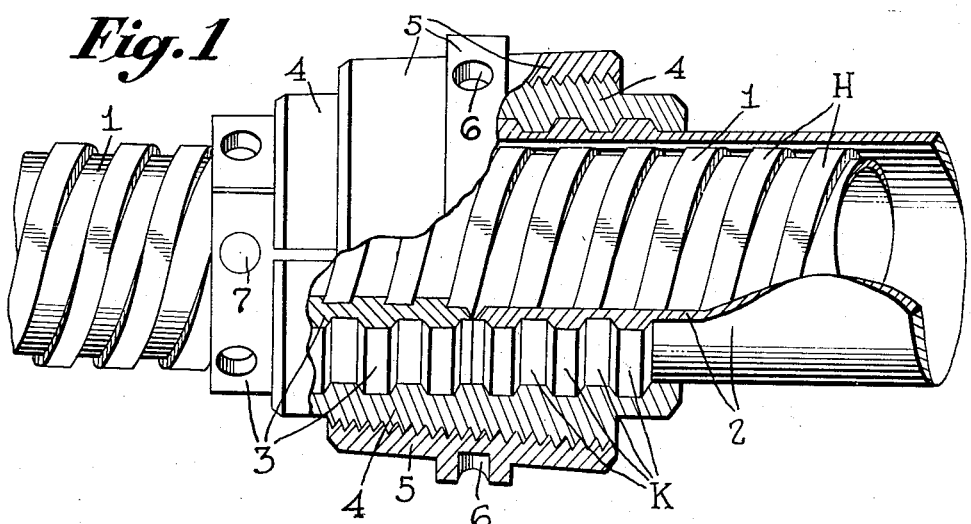
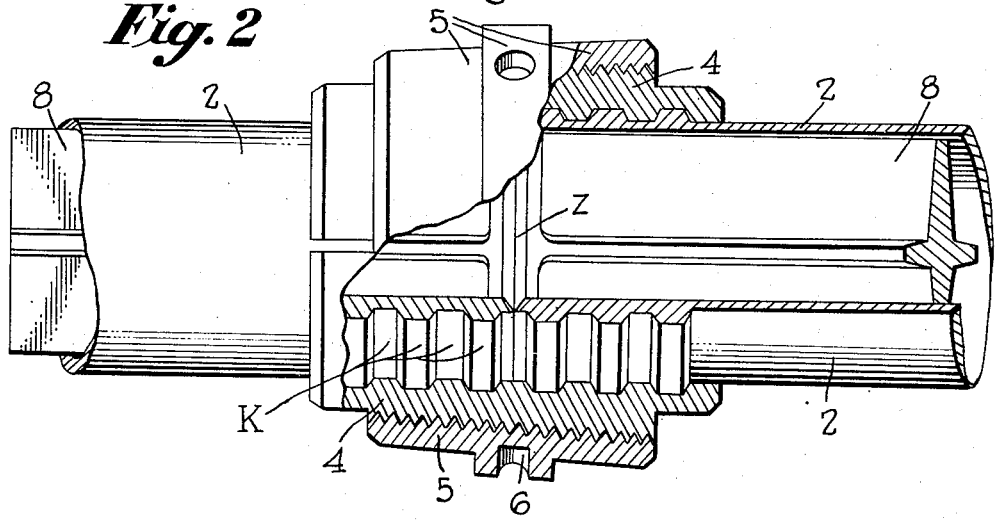
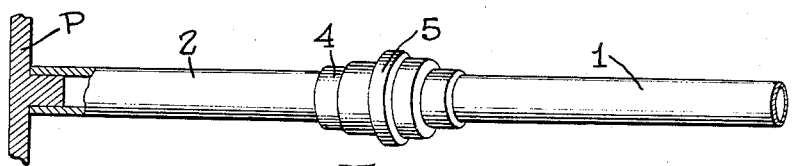
INVENTOR
ELZO BRUNO CAPRA
BY
ATTORNEYS Patented Aug. 24, 1954

2,687,317

UNITED STATES PATENT OFFICE 2,687,317

BRACE FOR SCAFFOLDS

Elzo Bruno Capra, Mantova, Italy

Application August 6, 1949, Serial No. 108,872

1 Claim. (Cl. 287—58)

This invention relates to braces for scaffolds used in building construction and similar structures.

In various types of scaffolds, wooden braces or links are commonly employed but wood requires cutting, fitting, and nailing and very frequently results in a structure of dubious strength and one which is wasteful of both materials and time.

It is an object of the instant invention to provide braces for scaffolds which may be readily adjusted to the required length.

Another object is to decrease accidents in building construction.

A further object is to decrease waste in the erection of temporary structures.

Other objects of the instant invention will become apparent in the course of the following specification.

In the accomplishment of these objectives, the braces are constituted of two types of hollow tubes of iron or similar material. One of the tubes has a greater diameter than the other so that telescoping may be resorted to between the two types of tubes if desired or the tubes of largest diameter may be connected together end on end. Especially designed couplings are provided for securing the tubes when telescoped and with but slight modification when attaching the tubes of greatest diameter end on end.

The invention will appear more clearly from the following detailed description when taken in connection with the accompanying drawings showing by way of example a preferred embodiment of the inventive idea.

In the drawings:

Figure 1 is a front view of the adjustable and fixed types of tubes telescoped and held together by the coupling, part of the surface of the fixed tube and the coupling being broken away to show the construction.

Figure 2 is a front view of two of the fixed tubes joined end on end and held together by a coupling but slightly different from the coupling shown in Figure 1.

Figure 3 is a front view on a reduced scale of the joined telescoped fixed and adjustable tubes with the free end of the fixed tube attached to one of the members to be braced.

Referring now in greater detail to the drawings where like reference numerals indicate like parts, reference numeral 1 indicates the adjustable tube, 2 the fixed tube, and 5 the keeper of the coupling which joins the tubes together.

The adjustable tube 1 is formed from any rigid metal and may have any outside diameter. The outer surface of the tube 1 is provided with an endless thread H.

The fixed tube 2 is also formed from any rigid material but with an inside diameter greater than the outside diameter of the previously mentioned adjustable tube 1 so that the latter may be slidably inserted or telescoped in the end of the tube 2. The ends of the tube 2 are provided on the outer surface with the spaced grooves K.

When inserting the end of tube 1 in the end of tube 2 and properly tightening the joined members, it has been found convenient to provide a coupling which will both control the extent to which the tube 1 is telescoped in tube 2 as well as secure together the two tubes when the telescoping has been completed. At least the end of the telescoping operation, as shown in Figure 1, is accomplished with the use of the socket member 3 which is internally threaded to coact with the endless external thread of the tube 1 while the outer surface is provided with spaced grooves coacting with a split conical connector 4 of sufficient length for coaction also with the spaced grooves K on the end of the fixed tube 2. The outer surface of the split conical connector 4 is threaded and over that is screwed a keeper 5. Openings 7 in the socket member 3 and 6 in the keeper 5 permit turning the respective members with a removable lever or handle member not shown.

Of course, in any structure involving braces, there will be occasions when it will be found convenient to attach two of the fixed tubes 2 end on end. For that purpose, a coupling similar to that previously described for connecting the telescoped tubes 1 and 2 is used and illustrated in Figure 2 but it will be noted that the socket member 3 of the telescoped tubes is omitted while a reinforcing member 8 has been added through the abutting open ends of the tubes 2. Thus, when tightening the keeper 5 there is little danger of the tubes collapsing.

The operation with the adjustable and fixed braces is as follows:

Suppose it is desired to brace two uprights of a scaffold one of which is shown in section as P in Figure 3. One end of the fixed tube 2 is rotatably attached over a projection of any suitable type and fastened to the upright P or formed integral therewith. Further, suppose that the opposite or second upright (not shown) is too near the first for the use of a second tube 2 attached end on end as shown in Figure 2 so that an adjustable tube 1 must be used. With the socket member 3 (Fig. 1) screwed back on the tube 1 away from the end and out of the way and, if necessary, the tube 2 temporarily removed from the upright P, the end of the tube 1 from which the socket member 3 has been threaded back is telescoped into the free end of the tube 2. The opposite end of the tube 1 is then inserted over a projection on the second upright and similar to that already described in connection with the first upright P. Thus, the tubes 1 and 2 will be loosely held together by virtue of the telescoping. The socket member 3 is next threaded toward the fixed rod 2 until in contact with the end thereof whereupon the adjustable rod 1 will move out of the fixed rod 2, as long as the socket member 3 can be rotated, forcing the tubes against the uprights. When the desired adjustability has been attained, the split conical connector 4 can be inserted over the socket member 3 and the coacting end of the tube 2 and the keeper 5 threaded thereover securely holding the various members together.

Operation with the fixed tubes 2 is similar except that no socket member 3 is involved but with the reinforcing member 8 inserted as shown in Figure 2.

It is apparent that the specific illustrations shown have been given by way of illustration and not by way of limitation and that the structures above described are subject to wide variation and modification without departing from the scope or intent of the invention, all of which variations and modifications are to be included within the scope of the present invention.

What is claimed is:

A coupling for releasably connecting the ends of two segments of a scaffold brace, at least one of the segments being hollow for the telescopic insertion of the other, the end extremity of the hollow segment having spaced annular grooves formed on the outer surface thereof and the end extremity of the telescoped segment being externally threaded; the coupling comprising an internally threaded socket member coacting with the externally threaded end extremity of the telescoped segment, the outer surface of the socket member having a diameter substantially equal to the outside diameter of the hollow segment and further having spaced annular grooves formed on the outer surface, a split connector for the hollow segment and the socket member, the inner surface of the split connector coacting with the grooves on the hollow segment and the socket member, the outer surface of the split connector being conical and threaded, and a keeper for the split connector, the keeper having a threaded conical bore coacting with the externally threaded conical surface of the split connector.

References Cited in the file of this patent

UNITED STATES PATENTS

| Number | Name | Date |
| --- | --- | --- |
| 50,190 | Watson | Sept. 26, 1865 |
| 1,533,019 | Link | Apr. 7, 1925 |
| 1,900,366 | Riebel | Mar. 7, 1933 |
| 2,067,271 | Johnson et al. | Jan. 12, 1937 |